(12) United States Patent
Kladitis et al.

(10) Patent No.: US 11,866,839 B2
(45) Date of Patent: Jan. 9, 2024

(54) COMPOSITE CARBON NANOTUBE STRUCTURES

(71) Applicant: University of Dayton Research Institute, Dayton, OH (US)

(72) Inventors: Paul Kladitis, Clayton, OH (US); Brian Rice, Dayton, OH (US); Lingchuan Li, Mason, OH (US)

(*) Notice: Subject to any disclaimer, the term of this patent is extended or adjusted under 35 U.S.C. 154(b) by 0 days.

(21) Appl. No.: 17/865,965

(22) Filed: Jul. 15, 2022

(65) Prior Publication Data

US 2023/0016467 A1    Jan. 19, 2023

Related U.S. Application Data

(60) Provisional application No. 63/222,476, filed on Jul. 16, 2021.

(51) Int. Cl.

| | |
|---|---|
| *C25D 13/02* | (2006.01) |
| *C01B 32/16* | (2017.01) |
| *C01B 32/168* | (2017.01) |
| *C25D 7/06* | (2006.01) |
| *C25D 13/16* | (2006.01) |
| *C25D 5/54* | (2006.01) |
| *C25D 3/38* | (2006.01) |
| *B21D 39/02* | (2006.01) |

(Continued)

(52) U.S. Cl.
CPC .............. *C25D 13/02* (2013.01); *B21D 39/02* (2013.01); *C01B 32/16* (2017.08); *C01B 32/168* (2017.08); *C25D 3/38* (2013.01); *C25D 5/54* (2013.01); *C25D 7/0607* (2013.01); *C25D 13/16* (2013.01); *B82Y 30/00* (2013.01); *B82Y 40/00* (2013.01); *C01B 2202/08* (2013.01); *C01P 2004/03* (2013.01)

(58) Field of Classification Search
None
See application file for complete search history.

(56) References Cited

U.S. PATENT DOCUMENTS

| | | | |
|---|---|---|---|
| 2012/0000691 A1* | 1/2012 | Shah | B82Y 30/00 977/932 |
| 2022/0184748 A1* | 6/2022 | Cola | C23C 14/18 |

FOREIGN PATENT DOCUMENTS

| | | | | |
|---|---|---|---|---|
| WO | WO-2017191415 A1 | * | 11/2017 | C01B 32/16 |

OTHER PUBLICATIONS

Sangar et al. WO 2017/191415 A1, machine translation (Year: 2017).*

(Continued)

*Primary Examiner* — Wojciech Haske
(74) *Attorney, Agent, or Firm* — Thomas E. Lees, LLC (57) ABSTRACT

A process for making a carbon nanotube structure includes forming a composite by depositing or growing carbon nanotubes onto a metal substrate, and infusing the carbon nanotubes. In other aspects, a method of making a wire, includes coating carbon nanotubes on a wire, and electroplating the carbon nanotubes. In still other aspects, a method of making a conductor includes growing or depositing vertically aligned carbon nanotubes on a sheet. Yet still, a method of making a cable includes forming multiple composite wires, each composite wire formed by depositing or growing carbon nanotubes onto a metal substrate, and performing a metal infusion of the carbon nanotubes. The method also comprises combining multiple finished composite wires or objects to make large cables or straps.

6 Claims, 6 Drawing Sheets

(51) Int. Cl.
  *B82Y 30/00* (2011.01)
  *B82Y 40/00* (2011.01)

(56) References Cited

OTHER PUBLICATIONS

Li et al. Composites Science and Technology 187 '2020' 107946 (Year: 2020).*

* cited by examiner

COMPOSITE CARBON NANOTUBE STRUCTURES

CROSS REFERENCE TO RELATED APPLICATIONS

This application claims the benefit of U.S. Provisional Patent Application Ser. No. 63/222,476, filed Jul. 16, 2021, entitled "COMPOSITE CARBON NANOTUBE STRUCTURES", the disclosure of which is hereby incorporated by reference.

BACKGROUND

Various aspects of the present invention relate generally to carbon nanotube structures, such as wires and other conductive composites, and more particularly, to industrially producible, light weight and high conductivity metal/nanocarbon composite structures such as wires and cables.

A wire is typically a strand or rod of a conductive material, such as a metal, which is used to bear an electrical load. In this regard, wire can be used to convey electrical power. Wire can also be used as a medium for distributing information such as communication signals. An electrical cable is an assembly of one or more wires, which are often bundled together so as to run side-by-side.

BRIEF SUMMARY

According to aspects herein, a method of making a carbon nanotube structure comprises forming a composite by depositing or growing (i.e., adding) carbon nanotubes, radially, onto a metal substrate, and performing an infusion of the carbon nanotubes.

According to further aspects herein, a method of making a wire comprises coating carbon nanotubes on a wire, and electroplating the carbon nanotubes.

According to yet further aspects of the present disclosure, a method of making a wire comprises forming a composite by obtaining a carbon nanotube thread, and performing an infusion of the carbon nanotubes to create a substrate for processes herein.

According to still further aspects of the present disclosure, a method of making a conductor comprises growing or depositing vertically aligned carbon nanotubes on a sheet.

According to additional aspects of the present disclosure, a method of making a cable is provided. The method comprises forming multiple composite wires, each composite wire formed by depositing or growing carbon nanotubes onto a metal substrate, and performing a metal infusion of the carbon nanotubes. The method also comprises combining multiple finished composite wires or objects to make large cables or straps.

DETAILED DESCRIPTION

Aspects herein provide a process, system and article of manufacture that realizes low cost and industrially scalable metal-carbon nanotube composite structures. Aspects herein are particularly well suited to manufacture wires, cables, sheets, foils, etc., as described more fully herein.

Aspects herein mix traditional wire and cable metal, such as copper (Cu), with carbon nanomaterial such as carbon nanotubes (CNTs) in an inexpensive and industrially scalable manner, resulting in relatively lighter weight wires and cables compared to conventional wires and cables. Composite wires and cables as set out herein, also provide comparable or superior properties to conventional wires and cables. Compared with traditional copper wires, composite wires set out herein have improved mechanical properties, such as one or more of: close or better electrical conductivity, higher ampacity, lower coefficient of thermal expansion (CTE), better chemical stability, lower mass density, lower mass density, and less increase of resistivity as increase of temperature.

In this document, a wire is a single conductor whereas a cable is a group of conductors. Both can be small or large gauge and used in any electrical or mechanical application.

Introduction

Copper is a typical material used to produce wires, foils and films for conducting electricity owing to its high electrical conductivity. Compared with aluminum, another alternative material, copper has higher conductivity (e.g., $5.96 \times 10^5$ S/cm vs $3.77 \times 10^5$ S/cm at room temperature). Ampacity or the current carrying capacity of copper is also many times higher than aluminum. These qualities make copper extensively used in many components and parts, such as power cables, motor windings, leads in high-power printed electronic circuit boards, EMI (electromagnetic interference) shielding, transformers, etc. There have been increased demands to stimulate the quest for more advanced electric wires that have higher conductivity, ampacity, mechanical strength, lower coefficient of thermal expansion (CTE) and that are also more lightweight than the wires currently used in various components, especially those used in drones, aerospace, electric vehicles, and urban air mobility.

The individual carbon nanotube has high electrical conductivity, e.g. $0.35 \times 10^5$ S/cm for multi-walled carbon nanotubes and $1 \times 10^6$ S/cm for single walled carbon nanotubes. Moreover, it has considerably high specific electrical conductivity, e.g. $62.5 \times 10^4$ S/(cm g) for single walled carbon nanotubes, being ~9.8 times higher that of copper ($6.6 \times 10^4$ S/(cm g), owing to its lightweight characteristic. Single walled carbon nanotubes may have an ampacity of as high as $4 \times 10^9$ A/cm$^2$. Carbon nanotubes also have a considerably lower coefficient of thermal expansion and higher specific strength than copper. These qualities make carbon nanotubes an ideal filler in principle for Cu-CNT composite wires.

Specifically, composites of carbon nanotubes uniformly embedded in a continuous copper matrix have shown electrical conductivities similar to and exceeding copper at room temperature and high temperature, and maximum current carrying capacities 100-fold higher than copper in vacuum. Calculations indicate that carbon nanotube addition increases copper diffusion activation energy, curbing copper failure in the composites. However, preparing such CNT-Cu composites as macroscopic wires with high electrical performance and scalability potential is challenging.

Method of Making a CNT Composite—Example 1

Figure 1:
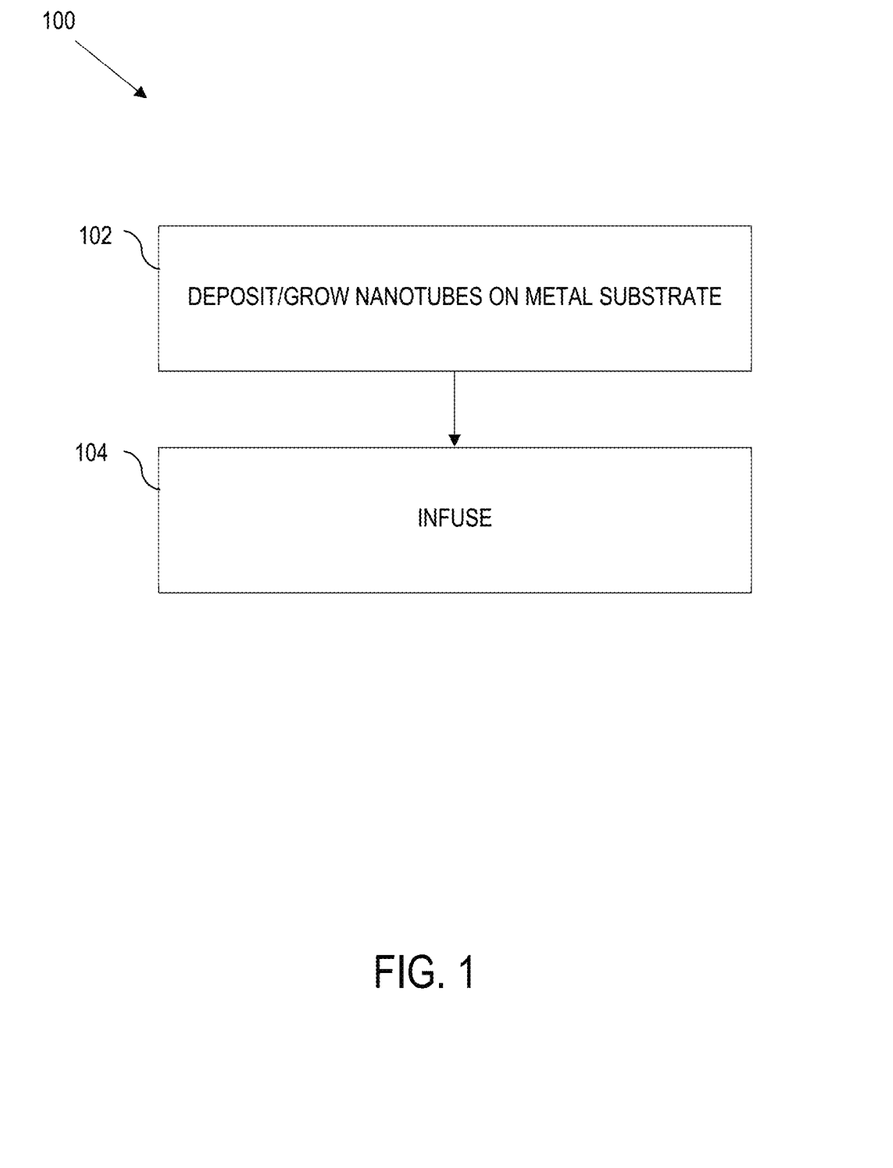
FIG. 1 is a flowchart illustrating a method of making a wire according to aspects herein.

Referring to drawings and in particular to FIG. 1, a method 100 is provided for making a carbon nanotube composite, such as a wire, cable, sheet, foil, or other suitable conductive carbon nanotube structure, according to aspects herein.

The method comprises forming a composite by adding (e.g., depositing, growing, etc.) at 102, carbon nanotubes onto a metal substrate, and performing an infusion at 104, of the carbon nanotubes.

For instance, the metal substrate can comprise a copper substrate or any other desired conductive substrate.

Also, the metal substrate can comprise a wire, cable, film, sheet, or any other desired shape.

In some embodiments, depositing or growing at 102, carbon nanotubes onto a metal substrate comprises depositing carbon nanotubes using electrophoretic deposition. In other embodiments, depositing or growing at 102, carbon nanotubes onto a metal substrate comprises growing carbon nanotubes by at least one of a Nano-Adaptive Hybrid Fabric (NAHF-X IP), an N12 vertically aligned carbon nanotube (VACNT IP) process, or a NAWA vertically aligned carbon nanotube (VACNT IP) process.

As used herein, a nano-adaptive-hybrid-fabric system (NAHF-X) includes that described more fully with reference to U.S. Pat. No. 8,895,105 B2, to Lafdi et al., Nov. 25, 2014, Receptor-Catalyst Growth Process for Carbon Nanotubes, the entirety of which is incorporated by reference herein.

In some embodiments, performing a metal infusion at 104 of the carbon nanotubes comprises performing a copper infusion of the carbon nanotubes through electrochemistry, deep infusion, etc.

In some embodiments, the method further comprises repeating depositing or growing, and performing a metal infusion of the carbon nanotubes a predetermined number of times necessary to build (layer by layer) a relatively thicker gauge of wire, to build a structure having a predetermined shape, combination thereof, etc.

In some embodiments, the method can optionally further include additional processing steps, such as cold folding to further compound the composite or change its shape, rolling to further compound the composite or change its shape, combinations thereof, etc.

Example 2

Aspects herein provide for the formation of a carbon nanotube composite structure.

At step 1, the deposition or growth of carbon nanotubes onto a substrate is carried out, e.g., on a substrate such as a copper substrate (wire, cable, film, or any shape). Carbon nanotube deposition methods include, but are not limited to, electrophoretic deposition. Carbon nanotube grown methods include, but are not limited to, NAHF-X IP, N12 VACNT IP, NAWA VACNT IP, etc.

At step 2, infusion, e.g., copper infusion of the carbon nanotubes is carried out, e.g., though electrochemistry, including deep infusion.

Step 1 and Step 2 can be repeated to build up a thicker gage wire or any shape structure.

Moreover, cold folding, rolling, other processing, combinations thereof, etc., may also be used to further compound the composite or change its shape. Moreover, methods herein can combine multiple finished composite wires or objects to make large cables or straps.

Example 3

Although example 3 is provided with regard to copper, it should be understood that aspects herein are not limited as such, and any metal can be used instead of, or in addition to copper.

Copper wire is coated with a coating of carbon nanotubes that has been electroplated with copper.

Figure 2:
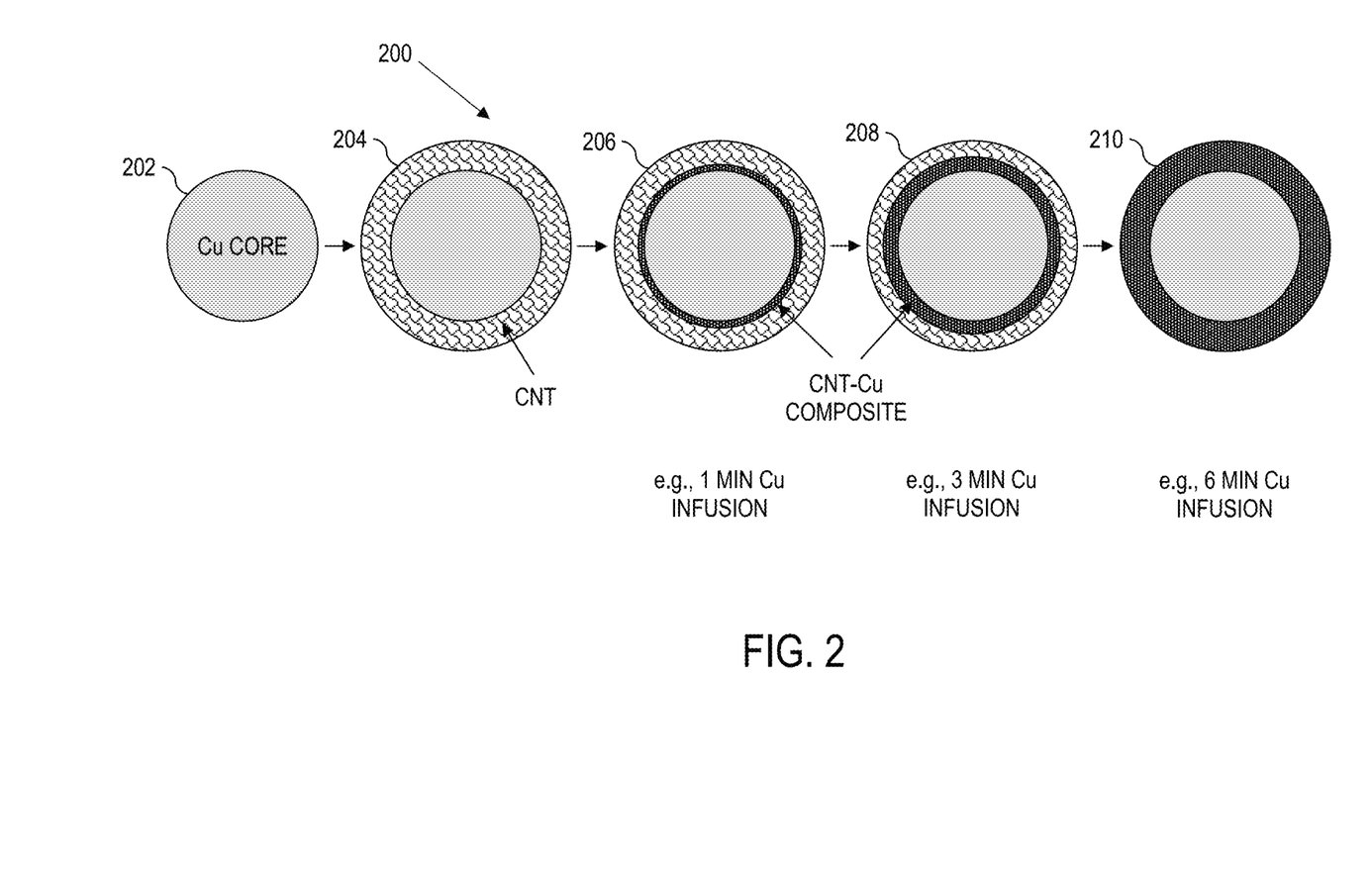
FIG. 2 is an illustration of coating of carbon nanotubes on a copper core wire with subsequent evolution of infusion of copper throughout the carbon nanotubes using a depth targeted electroplating technique.

Referring to FIG. 2, an illustration 200 of this configuration is shown with one centric layer of carbon nanotubes that are eventually covered with electroplated copper throughout. As illustrated in FIG. 2, a copper core is illustrated at 202. Carbon nanotubes are grown or deposited on the copper core at 204. Copper is infused into the carbon nanotubes at 206. In particular, 206 illustrates the composite wire after one minute of carbon infusion. Three minutes of carbon infusion is illustrated at 208, and 6 minutes of copper infusion is illustrated at 210. In practice, the time required for infusion is likely to vary. However, as illustrated, as the copper infusion process is continued, a carbon nanotube-copper composite shell forms around the copper core until at 210, the carbon nanotube-copper composite shell consumes the carbon nanotube outer layer.

The carbon nanotubes can be grown/added radially aligned, such as by using NAHF-X IP or deposited by methods such electrophoresis, by way of illustrative but non-limiting example.

Also, any number of layers (e.g., concentric layers, concentric identical layers, etc.) can be built up until the wire is at a desired diameter or ratio of copper to carbon.

Yet further, the finished wire can be further mechanically drawn down to resize, reshape, refine, or alter the properties of the wire, and/or multiple wires can be combined into a finished cable or further carbon nanotube coatings and copper electroplating can continue.

By way of an illustrative and non-limiting example, beginning with a small diameter copper wire as the core, well dispersed carbon nanotubes are coated on the copper core followed by an infusion of copper into the pores of the carbon nanotube network, e.g., by a bottom-up filling electroplating process, such as schematically shown in FIG. 2.

In some embodiments, the bottom-up infusion can bring a full copper infiltration while leaving the carbon nanotubes being well dispersed in the copper matrix. Aspects herein also include embodiments that comprise repeating the steps of the carbon nanotube coating and bottom-up copper infusion to build up the thickness of the composite. Methods to coat the carbon nanotubes onto the wire include spray of well dispersed carbon nanotube suspension, electrophoretic deposition, and chemical vapor deposition. The bottom-up infusion of copper is typically accomplished by electrodeposition of copper at ambient temperature.

Figure 3:
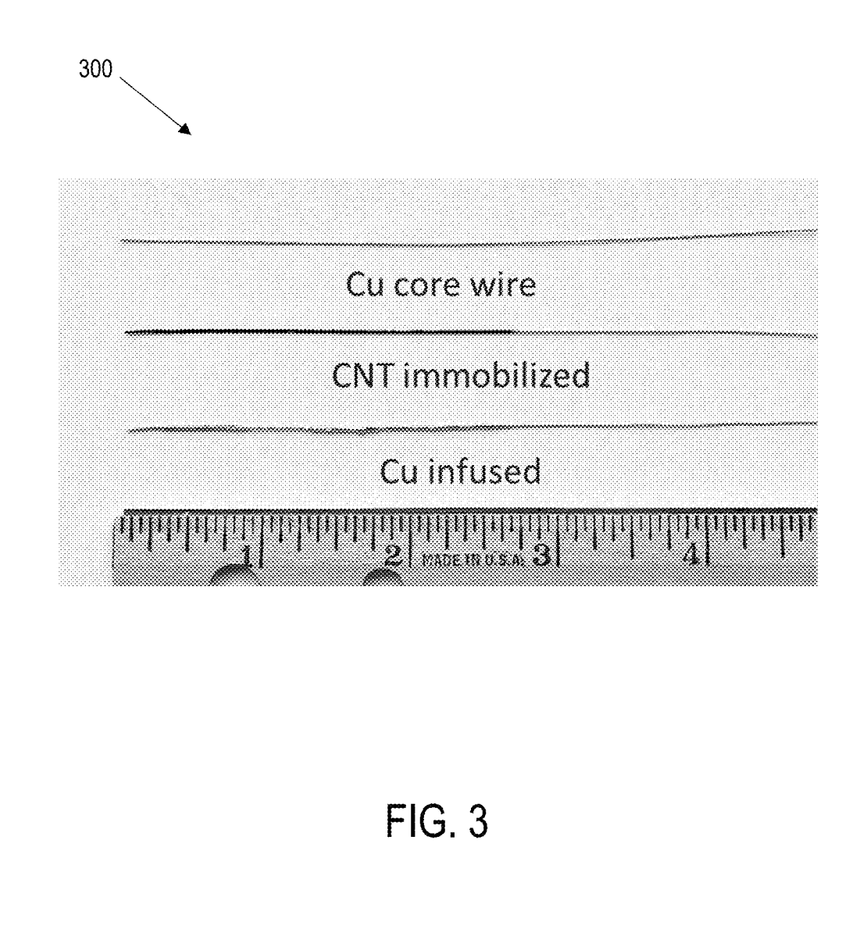
FIG. 3 is a photographic illustration of a copper core wire before and after immobilization of carbon nanotubes thereon, and after copper infusion in the carbon nanotube film.

Referring briefly to FIG. 3, a photograph 300 shows a copper core wire before immobilizing a carbon nanotube film coating on it 302 and after immobilizing a carbon nanotube film coating on it 304, and finally after infusing copper into the carbon nanotube film 306.

Figure 4:
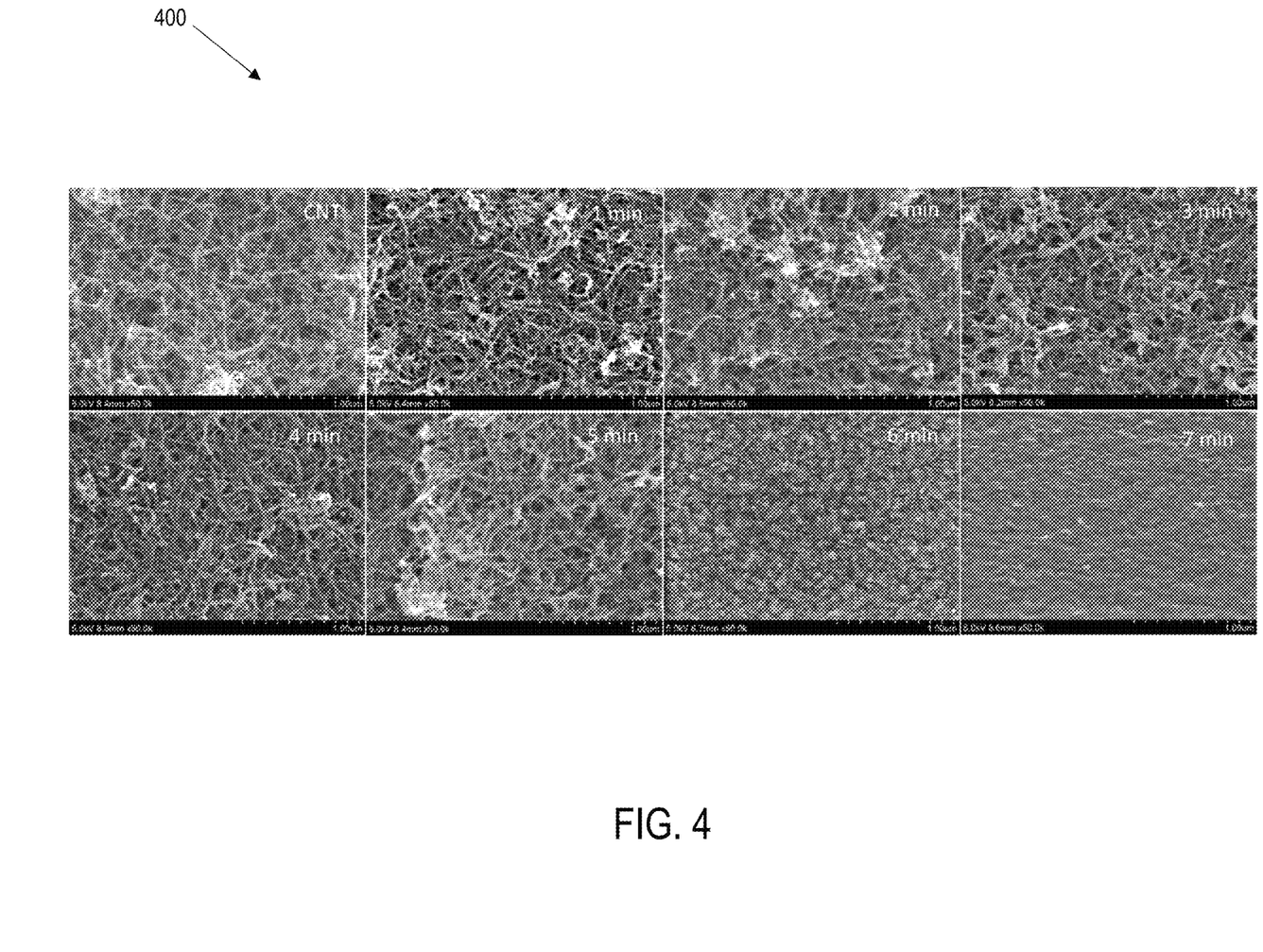
FIG. 4 is an example set of SEM images on a surface of an immobilized carbon nanotube film at experienced different times of copper infusion.

Referring to FIG. 4, a photograph 400 illustrates a sequence of SEM images of the surface of an immobilized carbon nanotube film coating as time elapses during the copper infusion process—in this place electroplating. FIG. 4 illustrates that the pores of the carbon nanotube network were kept open until copper infusion time, e.g., of 5-6 minutes in the illustrated example, when they were suddenly and completely filled in, indicating a successful bottom-up infusion of copper as described in FIG. 2.

Figure 5:
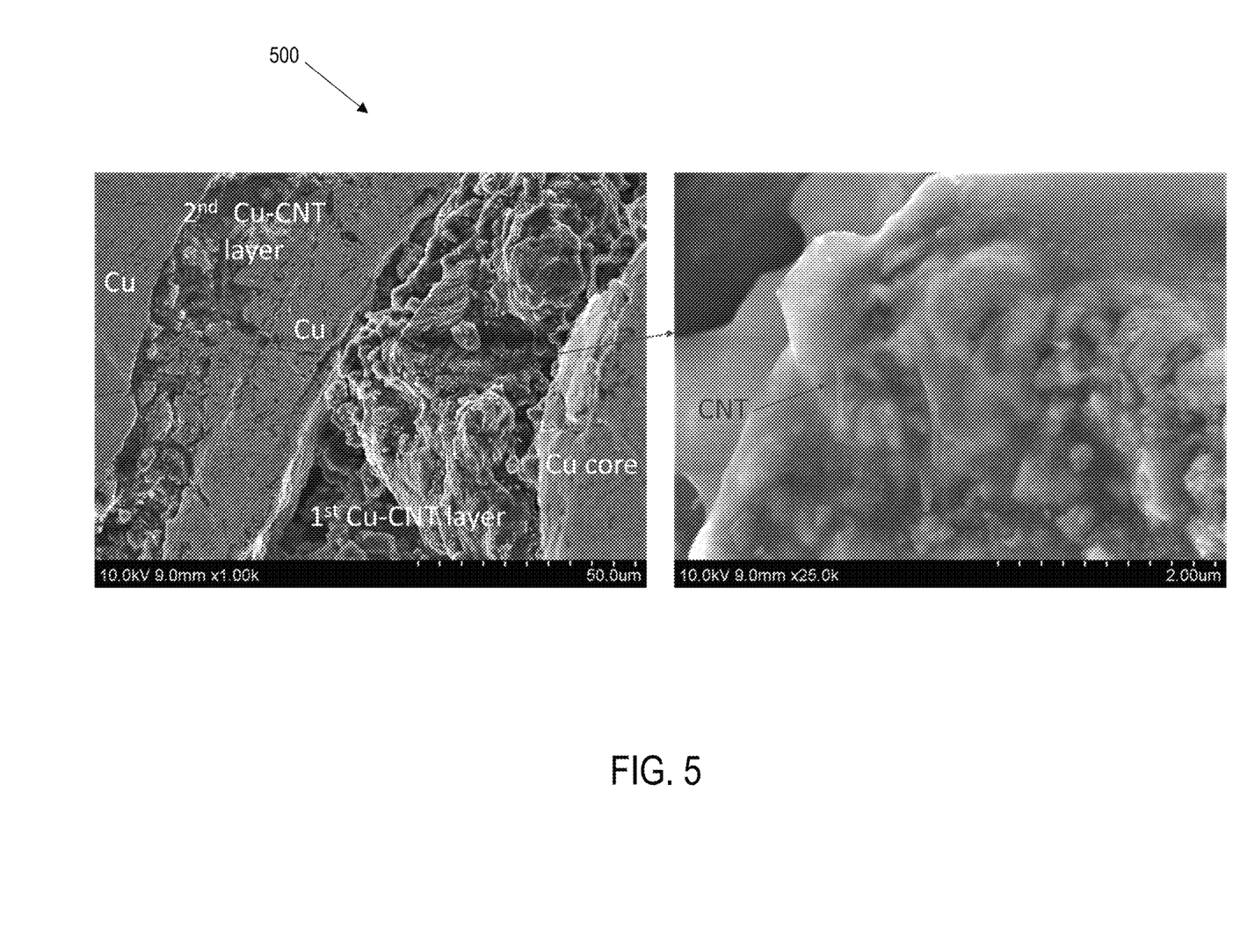
FIG. 5 illustrates a cross-section of an example wire with two composite layers of electroplated carbon nanotubes.

FIG. 5 shows a cross section 500 of a wire with two composite layers. In the Cu-CNT composite layer, the carbon nanotubes can barely be found, indicating that they are all well coated with copper. Measured conductivity of some composite wire samples indicates higher conductivity at present.

Example 4

Although example 4 is provided with regard to copper, it should be understood that aspects herein are not limited as such, and any metal can be used instead of, or in addition to copper.

In this example, a structure comprises a thread infused with copper by electroplating to create a substrate, which can then optionally be further coated with CNT and infused. In several embodiments, the CNT thread includes a metal core.

The carbon nanotube thread can be, for example, floating catalyst chemical vapor deposition grown and formed, pulled form VACNT forests, etc. radially from the substrate, as discussed above.

More carbon nanotubes can be grown radially aligned using NAHF-X IP or deposited by methods such electrophoresis, e.g., as described more fully herein.

An indefinite number of identical concentric layers can be built up until the wire is at a desired diameter or ratio of copper to carbon.

Additionally, in some embodiments, the finished wire can be further mechanically drawn down to resize, reshape, refine, alter, combinations thereof, etc., the properties of the wire.

In some embodiments, multiple wires can be combined into a finished cable or further carbon nanotube coatings and copper electroplating can continue.

Example 5

Although example 5 is provided with regard to copper, it should be understood that aspects herein are not limited as such, and any metal can be used instead of, or in addition to copper.

Vertically aligned carbon nanotubes are grown or deposited on a copper sheet that may or may not be further infused by copper through electroplating.

Figure 6:
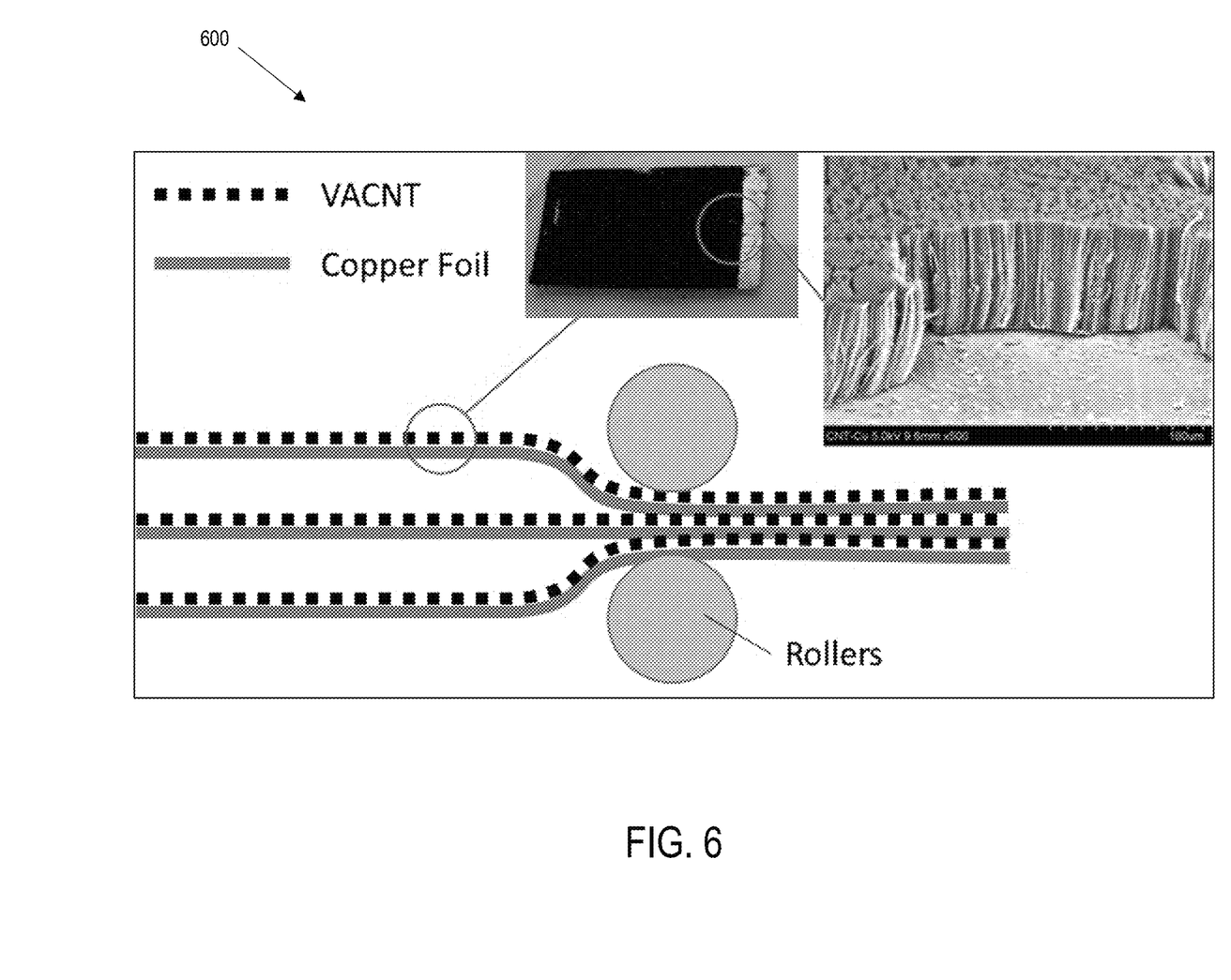
FIG. 6 is an illustration of multiple vertically aligned carbon nanotube coated copper sheets/foils stacked and cold rolled into a composite.

Referring to FIG. 6, an illustration 600 shows an example configuration with multiple vertically aligned carbon nanotube coated sheets stacked and cold rolled into a composite.

In example embodiments, the vertically aligned carbon nanotubes are grown using NAHF-X IP, etc., or are deposited by methods such electrophoresis.

Moreover, in some embodiments, an indefinite number of (optionally identical) layers can be built up until the sheet achieves a desired thickness or ratio of copper to carbon.

In some embodiments, the finished sheet with copper infused carbon nanotubes can be further and repeatedly mechanically folded, rolled, otherwise processed, combinations thereof, etc., e.g., to change its shape, size, properties, etc.

Yet further, in some embodiments, multiple sheets, e.g., with non-copper-infused carbon nanotubes can be stacked on top of each other and repeatedly rolled and folded (or otherwise processed) to create a refined cold mixture of copper and carbon nanotubes. In some example embodiments, the stacking of the sheets and direction of rolling can be arranged such that a preferred alignment of vertically aligned carbon nanotubes within the copper is maintained.

Traditional all metal wire and cables currently represent the state of the art (SOA). However, aspects herein provide systems, methods and products (e.g., composite wires and cables) that facilitate industrially produced oriented CNTs grown on all manner of substrates including metals. Here, the manufacture of composite wire has enabled the ability to combine metals such as copper with carbon nanomaterial such as CNTs in an inexpensive and industrially scalable manner resulting in lighter weight wires and cables with comparable or superior properties to conventional wires and cables.

In many traditional solutions to find a method for manufacturing metal/nano-carbon composite, copper is infused into CNT fiber (or CNT yarn), for example, by electrodeposition. However, infusing copper to CNT fiber leaves a product where the copper is mainly on a surface of the CNT fiber. However, conductivity of the resulting structure is less electrically conductive than just copper itself. Another traditional solution for manufacturing metal/nano-carbon composite is CNT and copper powder mixing (e.g., ultrasonication, ball milling, sintering, etc.) and compaction (e.g., sintering, compression and torsion, etc.) followed by die drawing. However due to limitations in the process, the result is often inhomogeneous CNT distribution in the Cu matrix and rampant CNT phase separation and agglomeration, especially at Cu grain boundaries. Processes of the present disclosure do not suffer from the limitations above.

Aspects herein provide a wire and/or wire cable that can replace traditional wires and cables, which have broad applications in many components and parts, such as power wires and cables in general, residential and commercial energy power lines and components (transformers, capacitors, etc.), motor and generator rotor and stator windings: residential and commercial, automotive power and signal wiring, aircraft power and signal wiring, spacecraft power and signal wiring, military power and signal wiring, electromagnetic effects management (e.g. EMI shielding, etc.).

Aspects herein provide particular advantage, such as for applications where weight reduction is at a premium such as drones, aerospace, electric vehicles, and urban air mobility, etc. That is, light weight composite wires are provided for any application where wires and cables are used, but unnecessary weight is undesirable.

Aspects herein provide a new approach for low cost and scalable production of metal-nanocarbon composite wire, cables, sheets, foils, and other structures. An initial estimation for the production of copper-CNT composite wire shows a material cost per kilogram (based on material and chemical prices in current market), which can be less than the cost of bare copper wire per kilogram depending on the wire gage. The fabrication can be carried out in a continuous mode for massive industrial production. Compared with convention all-metal wires, the composite wire can have one or more of the following improved properties: close or better electrical conductivity, higher ampacity, mechanical strength and fatigue, lower CTE, chemical stability such as corrosion resistance, lighter weight for the same current capacity, less increase of resistivity with increase of temperature.

Aspects herein can be generalized to any metal suitable for wire and cable application and any nano-sized carbon allotrope also suitable electrical current carrying applications.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. Aspects of the invention were chosen and described in order to best explain the principles of the invention and the practical application, and to enable others of ordinary skill in the art to understand the invention for various embodiments with various modifications as are suited to the particular use contemplated.

What is claimed is:

1. A method of making a carbon nanotube structure, comprising:
   forming a composite by:
      adding carbon nanotubes, radially, onto a carbon nanotube thread with a metal core; and
      performing an infusion of metal throughout the carbon nanotubes.

2. The method of claim 1, wherein adding carbon nanotubes, radially, onto a metal substrate comprises depositing carbon nanotubes using electrophoretic deposition.

3. The method of claim 1, wherein adding carbon nanotubes, radially onto a metal substrate comprises growing carbon nanotubes by at least one of a Nano-Adaptive Hybrid Fabric system or a NAWA vertically aligned carbon nanotube process.

4. The method of claim 1 further comprising repeating a predetermined number of times necessary to build a desired gauge of wire:
   adding carbon nanotubes, radially, onto a metal substrate, and
   performing a metal infusion of the carbon nanotubes.

5. The method of claim 1 further comprising repeating a predetermined number of times necessary to build a predetermined shape:
   adding carbon nanotubes, radially, onto a metal substrate, and
   performing a metal infusion of the carbon nanotubes.

6. The method of claim 1 further comprising:
   cold folding or rolling to further compound the composite or change its shape.

* * * * *